Aug. 5, 1924.
L. G. ZESBAUGH
1,503,620
TRACTOR ATTACHMENT
Filed April 10, 1922      2 Sheets-Sheet 1
Fig.-1
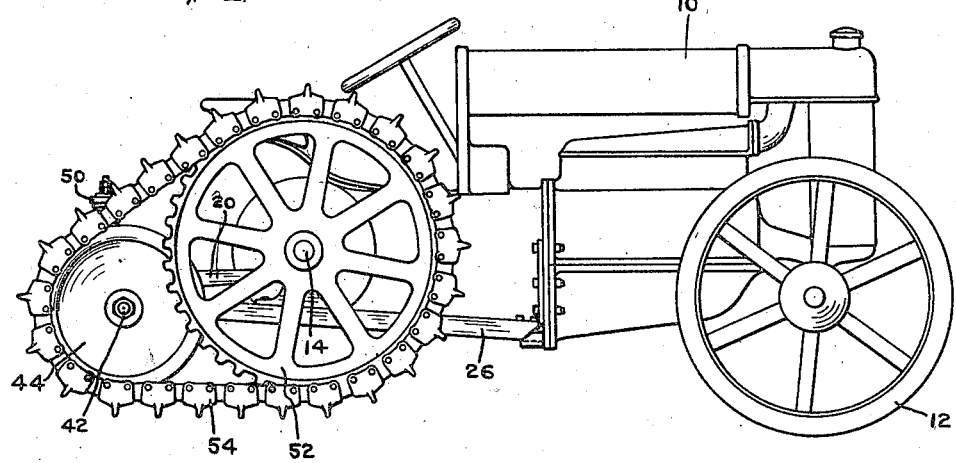
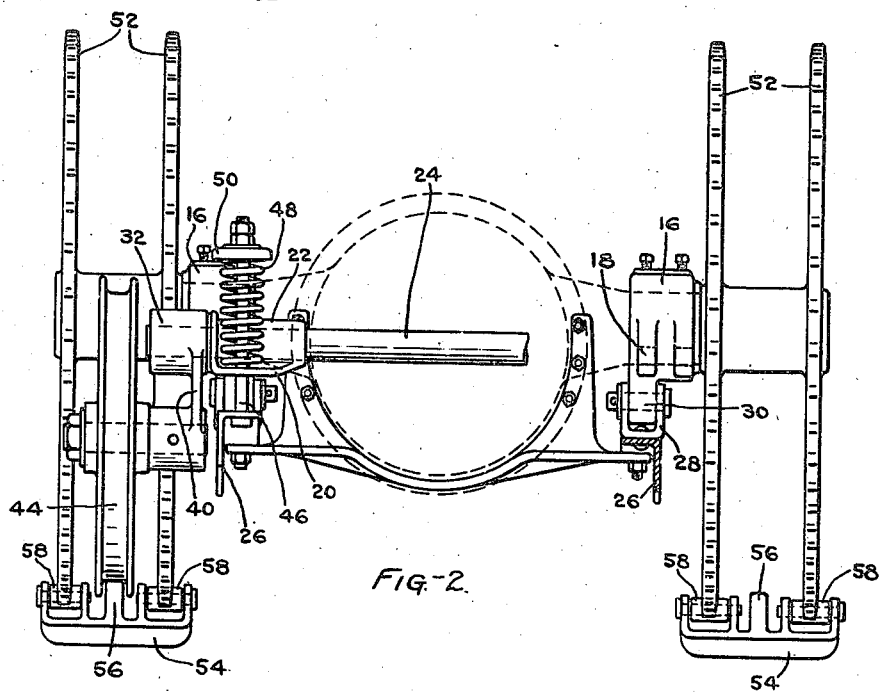
Fig.-2
INVENTOR
Lawrence G. Zesbaugh
BY Whiteley and Ruckman
HIS ATTORNEYS Aug. 5, 1924.

L. G. ZESBAUGH
TRACTOR ATTACHMENT
Filed April 10, 1922

1,503,620

2 Sheets-Sheet 2

INVENTOR
Lawrence G. Zesbaugh
BY Whiteley and Ruckman
HIS ATTORNEYS

Patented Aug. 5, 1924.

1,503,620

UNITED STATES PATENT OFFICE.

LAWRENCE G. ZESBAUGH, OF MINNEAPOLIS, MINNESOTA.

TRACTOR ATTACHMENT.

Application filed April 10, 1922. Serial No. 550,965.

*To all whom it may concern:*

Be it known that I, LAWRENCE G. ZESBAUGH, a citizen of the United States, residing at Minneapolis, in the county of Hennepin and State of Minnesota, have invented certain new and useful Improvements in Tractor Attachments, of which the following is a specification.

My invention relates to tractor attachments, and an object is to provide a device of the creeper type in which chain tractor belts running over sprocket drive wheels and idler wheels cause the tractor to be propelled.

The full objects and advantages of my invention will appear in connection with the detailed description, and the novel features embodied in my inventive idea will be particularly pointed out in the claims.

Figure 3:
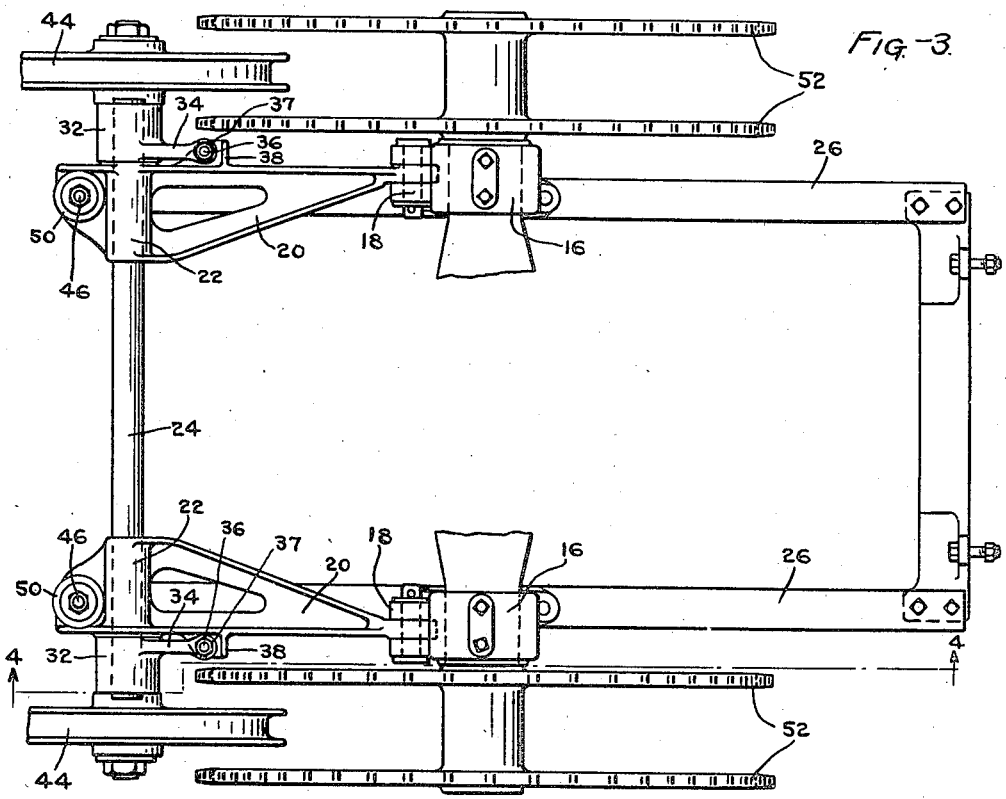
Figure 4:
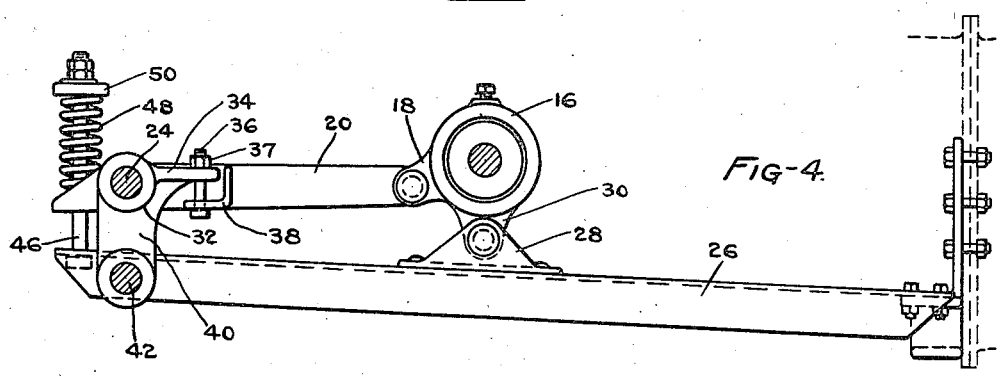

In the accompanying drawings which illustrate one of the forms in which my invention may be embodied, Fig. 1 is a side elevational view of my device applied to a tractor. Fig. 2 is a rear view of the device with certain parts broken away or removed. Fig. 3 is a top plan view of the device. Fig. 4 is a view in section on the line 4—4 of Fig. 3.

Referring to the construction shown in the drawings, the numeral 10 designates in general a tractor which may be of well known construction and which is provided with front steering wheels 12 and a rear driving and supporting axle 14 mounted in housings 16. Hinged to lugs 18 on these housings are rearwardly extending castings 20 which toward their rear ends are provided with hollow cylindrical members 22 within which is secured a shaft 24. Angle bars 26 are positioned below the casting 20 and are attached at their front ends to the tractor at places between the front steering wheels and the rear axle. The intermediate portions of these bars are provided with lugs 28 which are attached to lugs 30 depending from the housings 16. Secured upon the two ends of the shaft 24 are bell crank members 32 having forwardly extending arms 34. Bolts 36 extend through the free ends of these arms and through lugs 38 positioned on the castings 20 and these bolts are provided with adjusting nuts 37 by means of which the traction chain may be tensioned. The bell crank members 32 also have downwardly extending arms 40 at the lower ends of which are hollow cylindrical members for receiving stub shafts 42 on which flanged idler wheels 44 are mounted. Bolts 46 pass through the rear ends of the bars 26 and the castings 20 and, above the latter, the bolts are encircled by stiff springs 48, the upper ends of which engage collars 50 held on the upper ends of the bolts by lock nuts. The springs 48 are normally under compression and the idler wheels 44 will therefore be held downwardly by a pressure which may be varied by means of the lock nuts. Mounted upon the driving shaft 14 in place of the customary driving wheels are double flanged sprocket wheels 52. Chain traction belts such as disclosed in my prior Patent Number 1,261,989 dated April 9, 1918, pass around the sprocket wheels 52 and the idler wheels 44. These chain belts are so constructed that the lower stretch thereof may be flexed downwardly but cannot be flexed upwardly out of a straight line. The center lugs 56 of the chain belts are received between the flanges of the idler wheels 44 while the drive elements 58 of the belts are engaged by the teeth of the double flange sprocket wheels 52. The idler wheels 44 are preferably mounted only a comparatively short distance at the rear of the drive wheels and extend between the double flanges of the latter. In this manner the chain traction belts may be made considerably shorter than would otherwise be the case.

The operation and advantages of my invention will now be apparent. On account of the fact that a resilient downward pressure is maintained on the idler wheels, additional weight is thrown on the front steering wheels, the idler wheels can readily follow the contour of the ground, and downward pressure on the chain traction belts keeps them firmly upon the ground, thereby not only preventing slippage but relieving the weight on the sprocket drive wheels. The chain traction belts will be effectively driven on account of the drive elements or pin housings 58 being engaged by the teeth of the double flanged drive wheels. The traction belts will be guided upon the idler wheels on acount of the center lugs 56 being received between the flanges of these wheels. The term "tractor" has been used in its broad sense, and is intended to include trucks. This invention may be used either in the form of an attachment to replace drive wheels on a tractor already built or may be included in the fundamental design for a creeper type tractor.

I claim:

1. In a tractor having front steering wheels and a rear driving axle, the combination of sprocket drive wheels mounted on said axle, rearwardly extending castings hinged to the housings of said axle, a shaft secured to said castings, bars attached to the tractor and extending beneath said castings, downwardly extending members secured to the ends of said shaft, idler wheels mounted on said members, bolts attached to the rear of said bars and extending slidably through the rear of said castings, collars carried by the upper ends of said bolts, springs interposed between said collars and said castings, and chain traction belts passing around said drive wheels and said idler wheels.

2. In a tractor having front steering wheels and a rear driving axle, the combination of sprocket drive wheels mounted on said axle, rearwardly extending castings hinged to the housings of said axle, a shaft secured to said castings, bars attached to the tractor and extending beneath said castings, bell crank members secured to the ends of said shaft, said members having forwardly extending arms, means for adjustably securing said arms to said castings, said members also having downwardly extending arms, idler wheels mounted on said downwardly extending arms, bolts attached to the rear of said bars and extending slidably through the rear of said castings, collars carried by the upper ends of said bolts, springs interposed between said collars and said castings, and chain traction belts passing around said drive wheels and said idler wheels.

In testimony whereof I hereunto affix my signature.

LAWRENCE G. ZESBAUGH.